Feb. 21, 1928. 1,659,978
D. C. KLAUSMEYER
TELESCOPIC GUARD SYSTEM FOR DRILLS
Filed Feb. 11, 1925
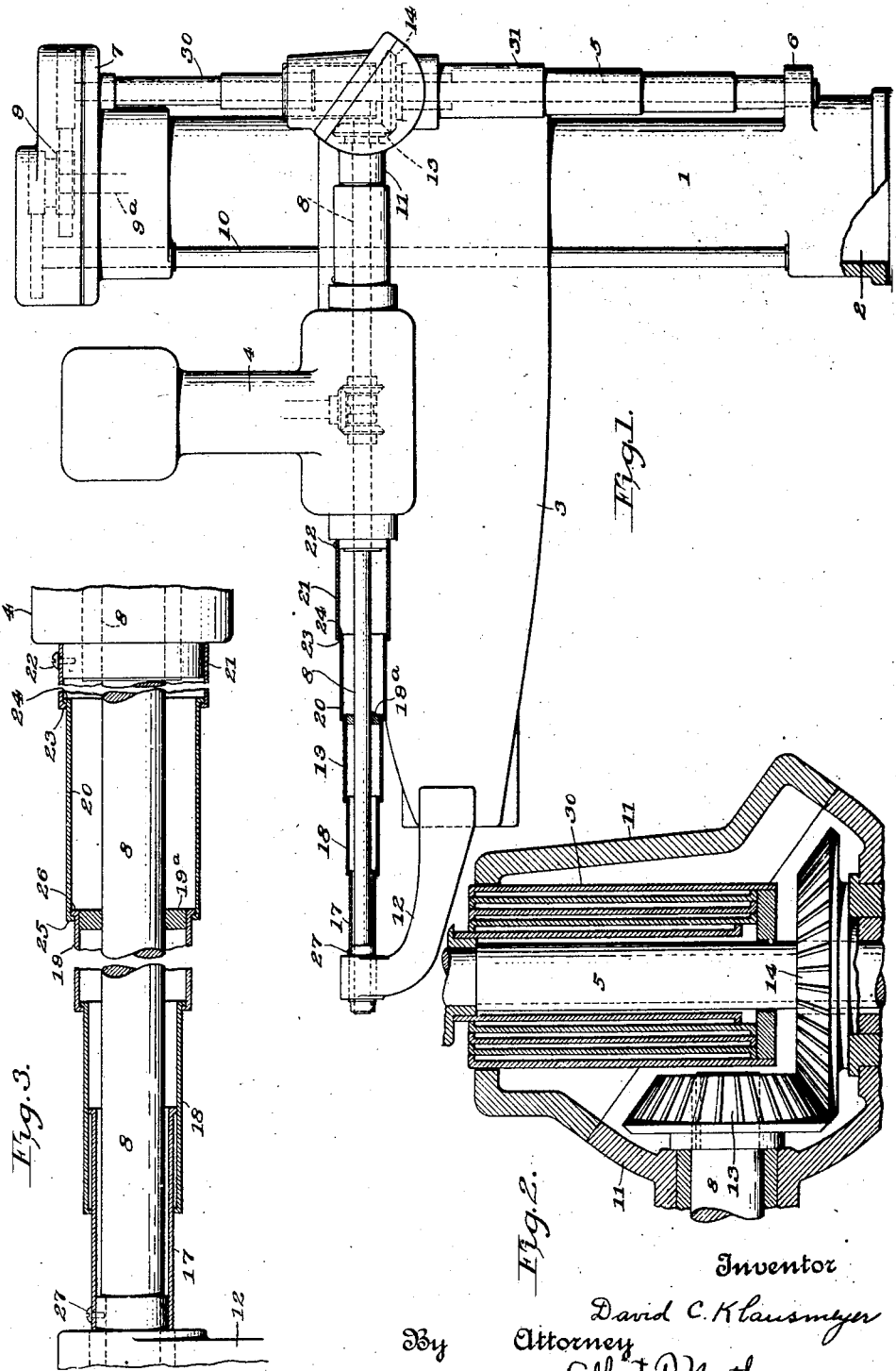
Inventor
David C. Klausmeyer
By Attorney
Albert P. Nathan Patented Feb. 21, 1928.

1,659,978

UNITED STATES PATENT OFFICE.

DAVID C. KLAUSMEYER, OF CINCINNATI, OHIO, ASSIGNOR TO THE CINCINNATI BICKFORD TOOL COMPANY, OF CINCINNATI, OHIO, A CORPORATION OF OHIO.

TELESCOPIC GUARD SYSTEM FOR DRILLS.

Application filed February 11, 1925. Serial No. 8,399.

This invention deals with safety mechanisms for protecting the operator of a drilling machine from injury by the moving parts thereof and is concerned chiefly in enclosing the rotating shafts on a radial drilling machine.

In a radial drilling machine, the radial arm, which carries the tool head, is movable vertically on a sleeve member or column. The tool head is connected to a rotating arm shaft having suitable bearings on the radial arm and the arm shaft is operatively connected to a vertical driving shaft mounted on the sleeve member. The vertical driving shaft and the arm shaft are in rotation during the operation of the machine and are more or less exposed. The vertical movement of the radial arm along the sleeve member renders it difficult to completely enclose the vertical driving shaft. In like manner, the movement of the tool head along the radial arm renders it difficult to completely enclose the arm shaft.

One of the important features of my invention is to completely enclose not only the vertical driving shaft but also to enclose the arm shaft which is connected to the vertical driving shaft. The enclosing of the two shafts is effected in such manner as not to interfere with the movement of the radial arm on the sleeve member and the movement of the tool head on the arm.

My invention provides collapsible interlocked members on the vertical driving shaft for completely enclosing such shaft during the operation of the machine and irrespective of the movement of the radial arm on the sleeve member. The collapsible members are preferably in the form of telescoping members which have sufficient rigidity to hold them out of contact with the rotating vertical shaft. The interlocked telescopic members on one side of the radial arm surround the vertical shaft and have their ends respectively connected to the radial arm and to the sleeve member near one end of the vertical shaft. The interlocked telescoping members on the opposite side of the radial arm have their ends respectively connected to the radial arm and to the sleeve member near the opposite end of the vertical shaft. In like manner, sets of interlocked telescoping members are mounted on the arm shaft at each side of the tool head. One set of interlocked telescoping members is connected at one end to the head and at the other end of the arm near the end of the arm shaft. The other set of telescoping members is connected to the other side of the head and to the arm near the opposite end of the arm shaft.

Other objects and advantages will be in part indicated in the following description and in part rendered apparent therefrom in connection with the annexed drawings.

To enable others skilled in the art so fully to apprehend the underlying features hereof that they may embody the same in the various ways contemplated by this invention, drawings depicting a preferred typical construction have been annexed as a part of this disclosure and, in such drawings, like characters of reference denote corresponding parts throughout all the views, of which:—

In the accompanying drawing, Figure 1 is an elevational view of a radial drilling machine having an arm shaft and a vertical driving shaft enclosed in accordance with my invention. Figure 2 is a sectional view through a portion of the vertical driving shaft and the end of the arm shaft on the machine shown in Fig. 1. Fig. 3 is a sectional view of a portion of the radial arm on the machine shown in Fig. 1.

Referring to the accompanying drawing, a radial drilling machine is illustrated comprising a sleeve member 1, which is rotatably mounted on a post or column 2. A radial arm 3, which carries a tool head 4, is slidably mounted on the sleeve member in the customary manner. The tool head 4, which carries a suitable cutting tool (not shown) is mounted on the arm to have sliding movement. A vertical driving shaft 5, which is mounted on brackets 6 and 7 projecting from the sleeve member 1, is provided for operating an arm shaft 8 on the radial arm 3. The vertical driving shaft 5 is operated by means of suitable gearing 9 which is located in the top of the sleeve member 1, as illustrated in Fig. 1 of the drawing. The gearing 9 also operates a shaft 10 for controlling the raising and lowering of the radial arm 3. A main driving shaft is located within the sleeve member and post for operating the gearing 9. Inasmuch as my invention is not concerned particularly with the specific driving means for operating the radial drill, a further description thereof is deemed unnecessary.

A bracket 11, which is best shown in Fig.

2 of the drawing, is secured to the radial arm 3 and serves as a bearing for one end of the arm shaft 8. The other end of the arm shaft 8 is provided with a bearing in a bracket 12 which extends from the end of the arm. The bracket 11, which provides a bearing for one end of the arm shaft 8, carries two bevel gear wheels 13 and 14. The bevel gear wheel 13 is fixedly mounted on the end of the arm shaft 8 and the bevel gear wheel 14 is splined to the vertical driving shaft 5. The bevel gear wheel 14 is rotatably mounted in the bracket 11 so as to follow the vertical movement of the radial arm 3 and be rotated in accordance with the rotation of the vertical driving shaft 5.

In the above construction, it will be noted the arm shaft 8 is completely exposed on each side of the tool head 4 unless provision is taken for covering it. In like manner, the vertical driving shaft 5 is left exposed on each side of the radial arm 3. In covering the arm shaft and the vertical driving shaft in accordance with my invention, collapsible members are provided which will cover the shafts irrespective of the movement of the tool head and of the movement of the radial arm. The collapsible means shown to the left of the tool head, as viewed in Fig. 1 of the drawing, comprises five telescoping members 17, 18, 19, 20 and 21. The members surround the shaft 8 and are connected to the bearing for the shaft 8 on the bracket 12 and to the head 4. The telescoping member 21, which is of a size adapted to contain the other telescoping members is connected to the tool head 4 by means of set screws 22, as shown in Fig. 3 of the drawing. A shoulder 23 on the telescoping member 21 is adapted to be engaged by a shoulder 24 on the telescoping member 20. The telescoping member 20 is provided with a shoulder 25 at the opposite ends thereof which is adapted to engage a shoulder 26 on the telescoping member 19. In like manner, the telescoping members 17, 18 and 19, are interlocked with each other. The telescoping member 17 is secured to the bearing in the bracket 12 by means of set screws 27, as shown in Fig. 3 of the drawing. A collar member 19ª, which is fitted to one end of the telescoping member 19, is provided for co-operating with the end members 17 and 21 to hold the telescoping members out of engagement with the shaft 8. Although only one collar member 19ª is shown on the drawing, it is to be understood that similar collar members may be associated with other telescoping members. A similar set of telescoping members is mounted on the shaft 8 at the opposite side of the tool head 4. The ends of the second set of telescoping members are respectively secured to the head 4 and to the bracket 11.

Two sets of telescoping members 30 and 31 are mounted on the driving shaft 5 at opposite sides of the radial arm 3. The two sets of telescoping members 30 and 31 are similar in construction and operation to the telescoping members heretofore described and further description thereof is deemed unnecessary. One end of the set of telescoping members 31 is connected to the bracket 6 and the other end thereof is connected to the bracket 11 on the arm. In like manner, one end of the set of telescoping members 30 is connected to the bracket 7 on the sleeve and the other end thereof is connected to the bracket 11 on the radial arm 3. In Fig. 2 of the drawing, the telescoping members 30 are shown completely nested within the bracket 11 when the radial arm is in its extreme upper position. The two sets of telescoping members 30 and 31 completely enclose the vertical driving shaft 5 at all times irrespective of the movement of the radial arm 3 on the sleeve member 1.

Without further analysis, the foregoing will so fully reveal the gist of this invention that others can, by applying current knowledge, readily adapt it for various utilizations by retaining one or more of the features that, from the standpoint of the prior art, fairly constitute essential characteristics of either the generic or specific aspects of this invention and, therefore, such adaptations should be, and are intended to be, comprehended within the meaning and range of equivalency of the following claims.

Having thus revealed this invention, I claim as new and desire to secure the following combinations and elements or equivalents thereof, by Letters Patent of the United States.

1. In a radial drilling machine, the combination comprising a radial arm; a tool head mounted to have sliding movement on said arm; a rotating arm shaft mounted horizontally on said arm and connected to said tool head; collapsible means surrounding the shaft and secured at one end to a bearing in the arm for said shaft and at the other end to the tool head, said means covering the shaft on one side of the head irrespective of the movement of the head, and spacer members secured to said collapsible members and slidingly mounted on said shaft for holding the collapsible means against sagging.

2. In a radial drilling machine, the combination comprising a radial arm; a tool head mounted to have sliding movement on said arm; a rotating arm shaft mounted lengthwise of said arm and connected to said tool head; a set of telescoping members surrounding said shaft on each side of the head, and means comprising collars connected to the end members and to an intermediate member on each side of the head for maintaining said telescoping members co-axial with said shaft.

3. In a radial drilling machine, the combination comprising a rotatable sleeve member; a radial arm movable along said sleeve member; an arm shaft mounted on said arm; a vertical driving shaft mounted on said sleeve member; a sliding bevel gear connection between the drive shaft and the arm shaft; a gear casing provided by said arm for enclosing said gears, said gear casing being formed with a chamber; and sets of relatively short telescoping members surrounding the vertical driving shaft on each side of the arm; the telescoping members on each side of the arm being connected at one end to the sleeve and at the other end to the arm near the end of the arm shaft, the upper of said sets of telescoping members being collapsible into said chamber to permit unobstructed upward movement of said arm.

4. In a radial drilling machine, the combination comprising a rotatable sleeve member; a radial arm movable along said sleeve member; a tool head mounted to have sliding movement on said arm; a vertical driving shaft mounted on said sleeve member; an arm shaft mounted on said arm and operatively connected to the tool head and to the vertical driving shaft; and a collapsible guard surrounding the vertical driving shaft on each side of the arm and a collapsible guard surrounding the arm shaft on each side of the head said pairs of guards serving continually to enclose the two shafts irrespective of the movements of the arm on said sleeve and of the movement of the head on the arm.

5. In a radial drilling machine, the combination comprising a rotatable sleeve member; a radial arm movable along said sleeve member; a tool head mounted to have sliding movement on said arm; a vertical driving shaft mounted on said sleeve member; an arm shaft mounted on said arm and operatively connected to the tool head and to the vertical driving shaft; telescoping members surrounding the vertical driving shaft on each side of the radial arm, the telescoping members on each side of the arm being connected at one end to the arm and at the other end to the sleeve member near the end of the vertical shaft; and telescoping members surrounding the arm shaft on each side of the tool head, the telescoping members on each side of the head being connected at one end to the head and at the other end to the arm near the end of the arm shaft.

In witness whereof, I have hereunto subscribed my name.

DAVID C. KLAUSMEYER.